Dec. 28, 1954     J. N. COOKE, JR     2,697,873
ELIMINATION OF SQUEAKS IN FABRICATED METAL PRODUCTS
Filed July 8, 1949     2 Sheets-Sheet 1
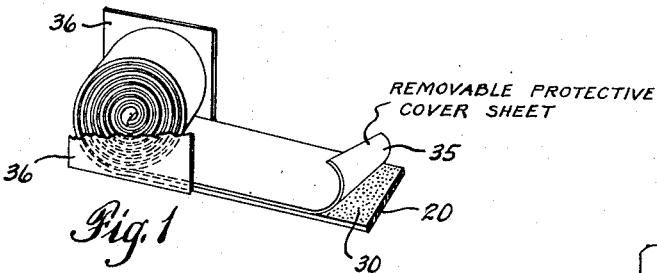
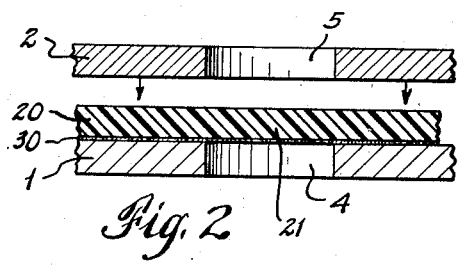
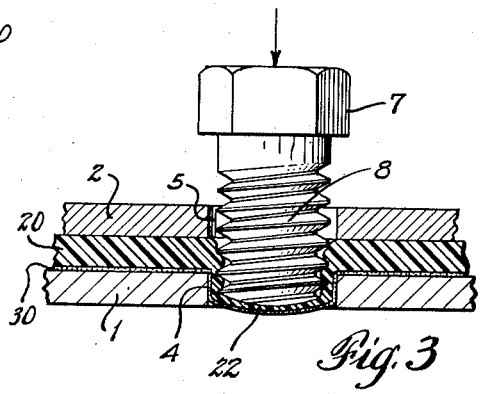
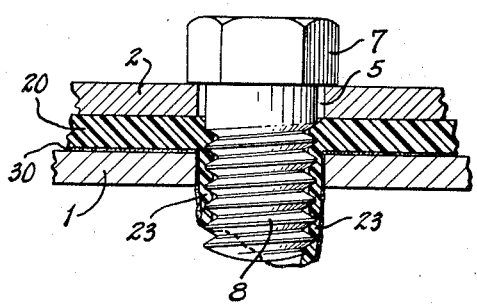
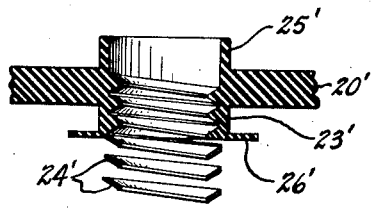
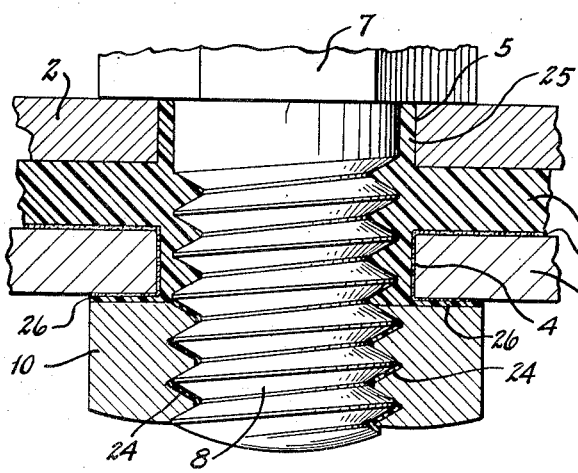
INVENTOR.
JAMES N. COOKE, JR.,
BY
Austin, Wilhelm + Carlson
ATTORNEYS.

Dec. 28, 1954     J. N. COOKE, JR     2,697,873
ELIMINATION OF SQUEAKS IN FABRICATED METAL PRODUCTS
Filed July 8, 1949     2 Sheets-Sheet 2
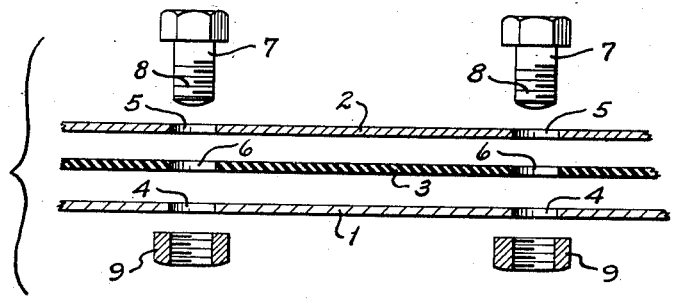
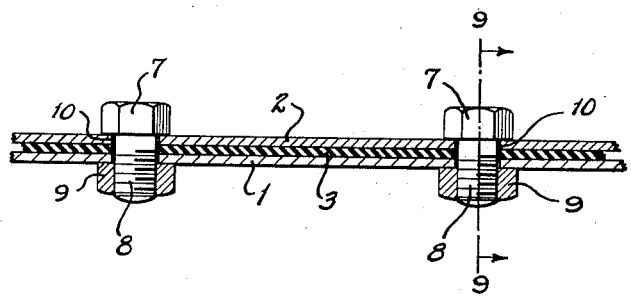
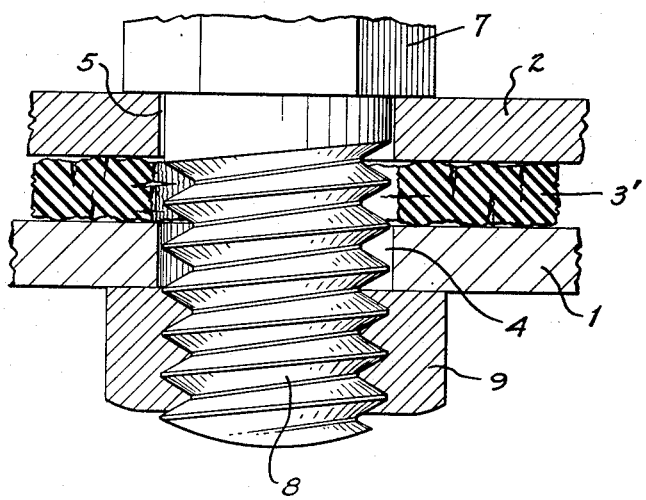
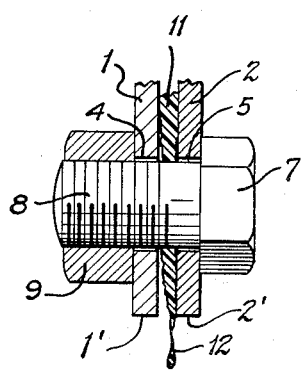
INVENTOR.
JAMES N. COOKE, JR.
BY
Austin, Wilhelm & Carlson
ATTORNEYS.

United States Patent Office 2,697,873
Patented Dec. 28, 1954

2,697,873

ELIMINATION OF SQUEAKS IN FABRICATED METAL PRODUCTS

James N. Cooke, Jr., Glen Rock, N. J.

Application July 8, 1949, Serial No. 103,616

4 Claims. (Cl. 29—460)

This invention is directed to the elimination of squeaks in fabricated metal products, and more particularly to an improved sealing compound and its utilization in the fabrication of metal products to cushion and seal the component metal parts in a manner to provide a durable and rugged construction and the elimination of objectionable squeaks and vibration noise when in use or in operation.

During the manufacture of automotive bodies and frames, and numerous other fabricated metal products which are subjected to vibration and variable strains during use and operation, it is customary to place a vulcanized rubber pad or strip interleaved between adjacent metal parts before connecting the parts together by tie bolts or screws. In the manufacture of such cushioned assemblies, the necessary bolt or screw receiving holes are first drilled or punched through the vulcanized rubber padding as well as through the metal parts, and the parts then bolted together. The bolt holes in the vulcanized rubber padding should be accurately punched to align with the corresponding holes in the adjacent metal parts between which the rubber pad or strip is to be interleaved.

At the appropriate stage during partial or complete assembly of the fabricated metal product, paint coats and lacquers are applied which require heat treatment in a baking oven, to thereby dry and cure the paint or lacquer in a manner to produce a hard, tough and wear resistant finish. Paints and lacquers commonly used require a drying and curing heat of approximately 250° F. to 400° F., which high heats are particularly advantageous in reducing the drying and curing time and thereby reduce the cost of production.

It has been found that these relatively high baking temperatures necessary and desirable to effect drying and curing of the finishing paint or lacquer, have a decidedly deleterious effect upon the vulcanized rubber interleaved between the metal parts during assesmbly, causing the vulcanized rubber cushioning pads or strips to shrink, dry out, lose resiliency and toughness, and generally become brittle, less resistant to vibration shocks, and finally disintegrate and crumble under vibration strains during use.

Further difficulty is encountered in the punching of the conforming holes in the vulcanized rubber pads or strips to receive the assembly bolts or screws. These holes must first be punched before the pad or strip is applied to the metal part, since the vulcanized rubber pad or strip cannot be punched when superimposed on the metal part. Due to the flexibility of vulcanized rubber, it is difficult to punch holes therein which will precisely align with the punched holes in the metal parts between which the pad or strip is to be interleaved, with the result that the punch holes are usually oversize so that in the final assembly the vulcanized rubber material is out of contact with the metal tie bolts or screws extending therethrough, with squeaks and vibration noises inevitably resulting from contact movement between the metal parts and the tie bolts or screws.

Cushioning interliners for assembled joints intended to provide an anti-squeak and sealing cushion between adjacent metal parts and made from thermoplastic synthetic resins, have also been tried. The results obtained in the use of synthetic resin interliners have not been satisfactory, since the synthetic resins tend to soften and flow when subjected to paint baking heats. As a result, such joint assemblies provide a finished metal product having loose bolts and nuts, with oozed-out plastic ridges extending along the edges of the metal parts, which prevents proper bonding of the underlying paint coat, and which therefore easily scrapes or peels off during use with consequent rusting of the underlying metal.

It is an object of this invention to provide an improved cushioning pad or strip designated to be interleaved between adjacent metal parts to be bolted or screwed together, which can be produced and manufactured at economical cost, which provides a tough and lasting anti-squeak cushion of adequate resiliency, and which overcomes the drawbacks of the pads or strips heretofore used.

Another object of this invention is to provide an improved cushioning pad or strip designed to be interleaved between adjacent metal parts, which is sufficiently semi-plastic to be moldable when pressed between the metal parts to fill all cavities, air spaces and voids, and to form a rubber lock washer between the nut and adjacent metal surface.

Another object of this invention is to provide an uncured rubber base compound which may be readily formed into cushioning pads or strips for use as an interliner for metal joints, which is moldable but not free-flowing when compressed as an interliner between adjacent metal parts, which is sensitive to the curing effects of paint baking heat, and which serves to provide a finished joint assembly wherein the metal parts are tenaciously bonded into durable union.

Another object of this invention is to provide an improved sealing and cushioning strip for metal joint assemblies compounded from a filler loaded rubber base material which is moldable but not free-flowing when pressure clamped between adjacent metal parts, and which contains curing and accelerating agents effective to convert the uncured rubber compound into a substantially cured, tough, resilient and durable sealing and cushioning medium when the joint assembly has been subjected to paint baking heats for the normal paint baking period.

Another object of this invention is to provide an improved interliner product for metal joints comprising a rolled strip of filler loaded uncured rubber containing curing and accelerated agents sensitively responsive to the curing effects of baking oven heat, said product having a pressure sensitive rubber cement coated on one surface thereof and covered by an impervious separator sheet protecting the rolled product from the time curing effects of the surrounding atmosphere.

Another object of this invention is to provide an improved interliner for metal joint assemblies formed into sealing and cushioning strips or pads from a rubber base material mixed with a filler substantially in excess of the rubber base material, and containing curing and accelerating agents, a plasticizer and an anti-oxidant in minor proportions, to provide a moldable and uncured interliner strip which is sensitively responsive to the curing effects of paint baking heats, and when thus cured, provides a highly durable joint assembly having tight bolts and nuts sheathed from the adjacent metal parts.

Another object of this invention is to provide an improved cushioning and sealing interliner for metal joints made into the form of a cushioning and sealing strip, compounded from filler loaded rubber containing curing and accelerating agents and having a pressure sensitive rubber cement coating by means of which the uncured interliner strip may be cemented to the interliner receiving face of one of the metal parts, which is compressible and moldable under the pressure exerted by tightening the bolts of the joint assembly, which when punctured by the inserted ends of the tie bolts will flexibly encase the bolt shanks and provide a sealing washer for the bolt nuts, and which is sensitively response to the curing effects of paint baking heats, and which when thus cured, provides a relatively hard yet resilient, tough and durable sealing and anti-squeak interlayer separating the bolts and nuts from the adjacent metal parts and tenaciously bonding the metal parts in durable union.

Another object of this invention is to provide an improved cushioned joint assembly comprising adjacent metal parts having a moldable cushioning and sealing strip interleaved therebetween, said strip being formed from filler loaded rubber having such moldable and flexure characteristics as to compactly fill all spaces between the adjacent metal parts, tenaciously encase the bolt shanks and adjacent portions of the bolt nuts, and provide, when subjected to the curing effects of paint baking heats, a tough, resilient and durable sealing and cushioning medium bonding the metal parts together in a long wearing joint assembly.

Another object of this invention is to provide an improved procedure for forming cushioned joint assemblies by adhesively securing an uncured filler loaded rubber strip to a metal part, and after applying the associated metal part, simultaneously puncturing the uncured rubber interlayer when inserting the tie bolt through the aligned holes in the metal parts, thereby simultaneously encasing the inserted bolt shank with an adhering layer of the rubber compound, applying and tightening the nut to the tie bolt, and thereafter curing the thus assembled interliner by subjecting the assembled joint to the curing effects of paint baking heat during the paint baking interval.

Another object of this invention is to provide an improved low cost procedure for fabricating metal products subjected to vibration during use which comprises, interlining adjacent metal parts of the product with an interliner strip compounded from filler loaded rubber containing a curing agent, applying tie bolts to the cushioned joint assembly thus formed, applying a paint finishing coat to the product, and simultaneously with the heat baking of the paint finishing coat, curing the interliner by the use of the paint baking heat and during the time interval required for such paint baking.

Other objects and advantages of this invention will become apparent as the disclosure proceeds.

Although the characteristic features of the invention will be particularly pointed out in the claims, the invention itself, and the manner to which it may be carried out, may be better understood by referring to the following description taken in connection with the accompanying drawings forming a part hereof, in which Fig. 1 is a perspective view illustrating the manner in which a strip of the improved cushioning and sealing interliner is prepared for shipment.

Fig. 2 is a fragmentary cross-sectional view illustrating the manner in which a strip or pad of this improved cushioning and sealing interliner is adhesively attached to an underlying metal sheet ready to receive the superimposed metal sheet, the metal sheets having aligned bolt holes therein with the interliner extending in an unbroken layer therebetween.

Fig. 3 is a fragmentary cross-sectional view of the cushioned joint, illustrating the flexure and molding characteristics of the uncured rubber interliner as the tie bolt is inserted into the sheet metal bolt holes and pushed into the uncured rubber interliner.

Fig. 4 is a fragmentary cross-sectional view of the cushioned joint, further illustrating the flexure and molding characteristics of the uncured rubber interliner when the tie bolt has been pushed completely through the interlayer, that portion of the interlayer material which originally spanned the bolt hole as shown in Fig. 1 having thus been molded to enwrap the bolt threads, filling the bolt hole cavities in the lower metal sheet.

Fig. 5 is a further enlarged fragmentary cross-sectional view of the cushioned joint assembly after the nut has been applied to the tie bolt and tightened with sufficient force to firmly clamp the metal parts together and drive the moldable interliner material into the bolt hole cavities into encasing contact with the bolt threads and thence flanging out in back of the nut to form a rubber lock washer and thereby additionally providing a sealing lock for the bolt nut.

Fig. 6 is a fragmentary cross-sectional view diagrammatically illustrating the approximate shape which the interliner assumes after curing and hardening in situ.

Fig. 7 is a fragmentary cross-sectional view diagrammatically illustrating the manner in which cushioned joints have heretofore been assembled by the use of a hole punctured vulcanized rubber sheet as the interliner.

Fig. 8 is a fragmentary cross-sectional view of the assembled cushioned joint as heretofore made employing a vulcanized rubber interliner, this view particularly showing the voids defined between the bolt holes and the bolt shanks which inevitably result when a relatively fixed and rigid interliner is employed.

Fig. 9 is an enlarged fragmentary cross-sectional view of the cushioned joint assembly of Fig. 8, after the joint assembly has passed through the paint baking oven, this view being intended to illustrate the deteriorated condition of the vulcanized rubber interlayer caused by the paint baking oven heat to which the joint has been subjected; and Fig. 10 is a fragmentary cross-sectional view of another prior art cushioned joint assembly, wherein the interliner is made from a thermo-plastic resin or synthetic plastic, this view illustrating the softened condition of the interliner when subjected to paint baking heats, resulting in a loose joint, loose nuts, loose tie bolts and a plastic smear which has oozed out of the joint and onto the newly painted surface.

Similar reference characters refer to similar parts throughout the several views of the drawings and the specification.

For a more complete understanding of this invention, reference is made to Figs. 7, 8 and 9 which illustrates a cushioned joint structure of the prior art, wherein a vulcanized rubber interlayer 3 is sandwiched and compressed between an underlying metal part 1 and an overlying metal part 2, secured together as by a tie bolt 7. In the fabrication of such cushioned joints, aligned bolt holes 4 and 5 are drilled or punched in the respective metal parts 1 and 2. Prior to assembly, aligning bolt holes 6 must also be punched through the vulcanized rubber cushioning strip 3, since the threaded shank 8 of the bolt 7 cannot be pushed or driven through vulcanized rubber without tearing or lacerating the same, or seriously stretching and thinning the vulcanized rubber interlayer 3, or pushing the vulcanized rubber through the bolt hole in the underlying metal part 1. Punching of aligning holes in the vulcanized rubber interliner is therefore a ncessary step in the production of these cushioned joints.

When the necessary bolt holes 4, 5 and 6 have been separately puched and formed in the metal parts 1 and 2 and the vulcanized rubber interlayer 3, these parts are assembled together as shown in Fig. 8 by inserting the threaded shanks 8 of the tie bolts 7 through the aligned bolt holes 5, 6 and 4, and then tightening the bolt nuts 9. To meet the practical requirements of high speed assembly and bolt hole alignment, it is common practice to make the diameter of the bolt holes 4 and 5 in the metal parts 1 and 2 and the bolt hole 6 in the vulcanized rubber interlayer 3, somewhat larger than the diameter of the bolt shank 9. Unoccupied space or voids 10 between the outer surface of the bolt shank 8 and the inner surfaces of the aligned holes 5, 6 and 4 inevitably result, producing a certain looseness around the bolts which give rise to squeaks and vibration noise when the fabricated metal product is subjected to the strains, stresses and vibration of normal use.

The use of vulcanized rubber interlayers to reduce squeaks and vibration noise has further serious drawbacks in cases where the fabricated metal product, of which such cushioned joints form a part, is to receive a baked enamel or paint finish, as in the manufacture of automobile bodies, chassis assemblies, rolling equipment, household equipment, and numerous other fabricated metal products. After the desired paint coating or finishing lacquer has been sprayed, brushed or otherwise applied to the fabricated metal product, the curing and hardening of the finishing coat is hastened and facilitated by heat treatment in a baking or drying oven under controlled heat conditions.

Painted or lacquered metal products are usually subjected to oven heats in the range of 250° F. to approximately 450° F., and in the automotive industry the painted or lacquered automotive bodies are subjected to an initial baking temperature in the range of 350° F. to 400° F. for a period of about ten minutes, followed by an after baking treatment at temperatures ranging from 250° to 300° F. for a period of approximately twenty minutes. To reduce the baking time and consequently save production cost, the highest baking temperature which the paint or lacquer coat will permit, is desirably employed.

Paint baking temperatures in the range of 250° F. to 400° F. have a decidedly deleterious and damaging effect on the vulcanized rubber interlayers sandwiched between the metal parts of the fabricated product. These high temperatures, cause the vulcanized rubber cushioning pads or strips to shrink and dry out, lose resiliency and toughness, and generally become brittle, less resistant to vibration shocks, and crumble under vibration strains during use.

Fig. 9 is intended to illustrate the cross-sectional appearance of the vulcanized rubber interlayer after it has been subjected to the relatively high paint baking heats, the interlayer having shrunk and contracted, lost resiliency and toughness, developed cracks and fissures, and in general has reached an advanced stage of disintegration as indicated by the partially disintegrated interlayer marked 3' in Fig. 9.

In an effort to overcome those known deficiencies of vulcanized rubber interlayers for cushioning purposes, various attempts have been made to substitute strips and pads compounded from vinyl resins and like thermoplastic resin materials. All such synthetic resin materials soften and melt when subjected to heat in the order of normal paint baking temperatures, with the result that molten plastic originally forming the interliner strips soften, flow and ooze from the joint, forming a plastic smear along the exposed edges of the joint which covers the adjacent newly painted surface. Fig. 10 is intended to illustrate the oozing characteristics of the synthetic resin interliner 11 when subjected to normal paint baking heat, and wherein the ribs or droplets 12 of molten resin has oozed out and subsequently hardened along the exposed outer edges 1' and 2' of the metal parts 1 and 2. This softening and oozing characteristic of synthetic resin interlayers also causes an appreciable thinning of the interlayer, resulting in loose nuts and bolts. Additionally, the oozed out ridges 12 flow out over the newly painted surfaces in an unsightly smear, and which prevents proper curing and metal bonding of the underlying paint. The paint coat then chips off, resulting in eventual rusting of the adjacent metal.

The uncured rubber compound formulated in accordance with this invention, provides a cushioning interlayer which is sufficiently moldable to fill all voids between the metal sheets or parts where it is interleaved, as well as any voids left in the bolt holes after insertion of the tie bolts, which provides a flexible wrapper encasing the threads of the bolt shanks and thereby serves to lock the bolt nuts in their tightened position which flanges out to provide a sealing washer for the bolt nut, which is sufficiently firm in texture and has sufficient cohesive strength to substantially maintain its compressed position between the overlying and underlying metal parts, which will flex and neatly puncture under the insertion pressure of the tie bolt and thereby obviate the necessity of pre-punching bolt holes therein, and which is compounded and tempered to cure or partially cure and harden under baking oven heat with accompanying substantial improvement in resiliency, toughness, hardness wearability and durability. This improved interlayer material, as thus assembled and heat treated, produces highly desirable cushioning qualities, having a vibration dampening and anti-squeak effectiveness not heretofore attained from any other material or cushioning procedures, and additionally produces a metal to metal bond of lasting durability and high bonding tenacity.

The material from which this highly effective cushioning interlayer is compounded, uses natural crepe rubber as a base, or a mixture of natural and synthetic rubber, with or without some reclaimed rubber added thereto. An eminently satisfactory and high quality interlayer can be produced by the use of natural crepe rubber alone.

A suitable rubber filler, such as pulverized clay or pulverized whiting, and preferably both clay and whiting, is admixed with the rubber base material in quantities to produce what is considered to be a heavily loaded rubber compound, for example from 200 to 600 parts of filler for 100 parts of the base rubber material. Sufficient filler is used to produce an interlayer when cured of limited resiliency, and before curing of definitely moldable but without appreciable flow characteristics. A highly satisfactory cushioning interliner has been made using as high as 500 pounds of filler to 100 pounds of rubber base stock, the filler comprising 200 to 300 pounds of clay and 200 to 300 pounds of whiting. A compound employing less than 200 pounds of filler to 100 pounds of rubber stock would not be preferable for fabrication into cushioning interliners.

A curing agent, comprising sulphur or zinc oxide, or a mixture of both, is added to the rubber-filler mixture to insure the desired curing of the interliner. It has been found that sulphur in an amount ranging from 1% to 5% of the rubber base stock, and/or zinc oxide in the amount of 3% to 12% of the rubber base stock, produces an interliner having desirable curing characteristics. Either sulphur or zinc oxide may be used as the curing agent, or a mixture of sulphur and zinc oxide may be used. When a relatively small quantity of sulphur is used, a relatively greater quantity of zinc oxide would be added. The amount of curing agent employed is varied in accordance with the degree of curing desired. It has been found that a curing mixture of 2% to 4% of sulphur and 2% to 5% of zinc oxide is highly effective in the production of high quality interliners to be subjected to paint baking heats.

A suitable accelerator is also added to the compound which serves to accelerate the curing effect of the added curing agents. The quantity of accelerating agent added is determined by the speed of curing desired. Where the interliner is to be subjected to paint baking heats, a sufficient quantity of accelerating agent is added to effect substantial curing of the interliner when subjected to approximately ten minutes of paint baking heat in the order of 300° F. to 400° F. Since this improved interliner compound would cure when exposed to atmospheric moisture and temperature conditions for a sufficient time period, the interliner strips or pads as manufactured, are packaged and stored under conditions whereby very little time curing occurs prior to actual use of the interliner in the joint assembly. When this improved interliner has been incorporated into the joint assembly, it is sensitively responsive to the curing effects of paint oven heat, so that the curing has very substantially progressed during the short time period that the interliner is subjected to paint baking heat, final curing of the interliner being thenceforth advanced and completed under the surrounding atmospheric conditions.

A small amount of plasticiser, such as an oil, is also added to the compound to retard curing prior to joint assembly, and to maintain the interliner adequately moldable when being incorporated into the joint assembly. The plasticising effect of the oil substantially disappears when the interliner is subjected to paint baking heat.

To retard hardening of the interliner strips during storage periods, it is also desirable to incorporate a rubber anti-oxidant in the proportions of approximately 1% of the basic rubber ingredient. The anti-oxidant assists in maintaining the moldability of the compound during storage periods, and up to time of incorporation of the interliner into the assembled joint, and subsequently serves to improve the aging qualities of the interliner in use.

After the material has been compounded, it is run through calender rolls and formed into sheets of the desired thickness. To prevent sticking of the compound to the calender rolls and to give the sheet a smooth surface finish, it is desirable to add to the compound a calendering lubricant comprised of paraffin and stearic acid. It has been found that by the addition of approximately 1% paraffin, that the calendering operation is substantially facilitated and a sheet with smooth surfaces produced.

One face of the sheet is then coated with a pressure sensitive rubber cement and an impervious separator sheet is then implied thereover. The separator sheet may be formed from a suitable resin plastic, or waxed or coated paper. A highly satisfactory separator sheet heretofore employed is made from a poly-ethylene plastic.

The sheet or blanket of interliner material, coated on one face thereof with a pressure sensitive rubber cement protected by a separator sheet, is cut into suitable strips of the size required for the particular joint cushioning purpose. As illustrated in Fig. 1, the product as packaged thus comprises an interliner strip 20 compounded from the uncured filler loaded rubber base material as heretofore described, covered on one side thereof with the pressure sensitive rubber coating 30 and protected by a cover strip 35. The thus assembled tape, comprising the interliner strip 20, cement coating 30, and protective cover strip 35 is rolled into a relatively tight roll when packaged for shipment.

The separator strip 35, thus interleaved between the wound layers or interliner strip 20, effectively prevents sticking of one interliner strip to another, protects the interliner against drying or untimely curing, and otherwise preserves the rolled strip in good condition during storage and until used in the joint assembly. Desirably, the side faces of the roll strip are also covered with an impervious separator sheet 36 as shown in Fig. 1, thus substantially sealing the rolled interliner from the atmosphere. The rolled interliner strip 20 as thus packaged, can be placed in corrugated paper boxes suitably closed and sealed, which should be desirably stored in a dry and cool place until the interliners are removed for use in joint assemblies.

When the uncured interliner 20 is to be used in a joint assembly, the protective cover strip 35 is pulled off and the cement coated face 30 thereof is pressed into adhesive contact with the joint forming surface of the metal part 1 as shown in Fig. 2, with the uncured and unpunctured interliner strip spanning the bolt holes 4 in the metal part 1 to provide a hole spanning portion 21. The companion metal part 2 is then placed over the interliner strip 20 with the holes 5 and 4 in the respective metal parts 2 and 1 in alignment.

The threaded shank 8 of the bolt 7 is then pushed through the aligned holes 5 and 4 in the joint forming metal parts 2 and 1, as illustrated in Figs. 3 and 4. The interliner compound molds around the threads of the tie bolts, with that part 21 of the interliner which spans the bolt hole 4, as shown in Fig. 2, thinning out into a membrane 22 as shown in Fig. 3, which eventually punctures as shown in Fig. 4. Thus the excess interliner material 21 which spans the bolt hole 4 as shown in Fig. 2 is drawn out by the bolt shank 8 to form an encasing collar 23 of uncured rubber compound which tenaciously adheres to the bolt shank 8 as shown in Fig. 4. It will be noted that the encasing collar 23 of uncured but moldable interliner compound also fills all voids in the bolt hole 4 not occupied by the bolt shank 8.

When the bolts 7 have thus been inserted, the bolt nuts 10 are applied. Some of the compound is smeared around and between the threads of the nut 10 and the bolt thread extending therethrough, providing an uncured rubber sealing skin 24 therebetween as shown in Fig. 5. As the bolt nut 10 is tightened, the metal parts 1 and 2 are drawn together, exerting a substantial molding pressure on the interlayer 20, which drives a portion of the compound into the superimposed bolt hole 5, forming an upwardly projecting collar portion 25 of uncured rubber which fills the voids in the bolt hole 5.

Additionally, some of the uncured rubber compound which covered the lower part of the bolt shank as shown in Fig. 4, i. e., the excess compound not required to form the sealing skin 24 within the nut 10 as shown in Fig. 5, is forced upwardly and eventually flattened when the bolt nut is fully tightened, providing a laterally flaring sealing washer portion 26 wedged between the upper face of the bolt nut 10 and the under face of the metal part 1.

When the joint is thus assembled as illustrated in Fig. 5, it will be noted that the voids between the metal parts 1 and 2, bolt shank 8 and the bolt nut 10 have been filled with the uncured interliner compound, and with the molded interliner compound under pressure contact with all adjacent metal surfaces.

When the assembled joint as shown in Fig. 5 is subjected to paint baking heat, the heat sensitive interliner compound is heat cured to produce a substantially heat vulcanized sealing and cushioning interliner of improved quality having toughness, strength, resiliency, anti-squeak and vibration dampening effectiveness, and high durability. Thus the paint baking heat converts the uncured rubber compound into a substantially modified material having the characteristics of freshly cured and heat vulcanized rubber of optimum hardness, toughness, resiliency and durability characteristics for interliner purposes.

Fig. 6 is intended to illustrate the permanent non-moldable shape which the thus cured and heat vulcanized rubber interliner assumes, comprising a heat vulcanized interliner pad 20' which becomes tenaciously bonded to the adjacent faces of the metal parts, a heat vulcanized collar portion 25' encasing the upper portion of the bolt shank and tenaciously bonded to the shank and the inner surface of the upper bolt hole, a heat vulcanized collar portion 23' filling the lower bolt hole and tenaciously encasing that portion of the bolt shank which extends therethrough, a heat vulcanized washer portion 26' wedged between and tenaciously bonded to the bolt nut and adjacent surface of the lower metal part, and finally a vulcanized bonding skin 24' interleaved between and bonding the bolt nut 10 to the adjacent threaded portion of the bolt shank contained therein.

Interliner strips and pads thus compounded, fabricated, heat treated and used in joint assemblies have yielded astonishing results. In the manufacture of automotive bodies for example, it has been found that the paint baking heat greatly improves and enhances the cushioning qualities and noise preventing effectiveness of this improved interliner. The paint baking heat serves to effect complete or a substantial curing of this interliner to a condition where it possesses all the desired characteristics including resiliency, toughness, wearability, durability, and lasting bonding power. Actual tests have shown that when this improved interliner has been used as the anti-squeak cushioning medium between adjacent metal parts, and after the heat treatment effected during the high speed paint baking operation, the adjacent metal parts have become so strongly bonded together by the thus cured interliner that it is difficult to separate the parts, even after the bolts have been removed, requiring chiseling tools to separate the metal parts.

This improved cushioning interliner does not shrink when cured by the paint baking treatment, so that the nuts and bolts maintain their tightened condition effected during the joint assembly operation. After the heat curing, the bolt nuts also become tenaciously bonded to the threaded bolt shanks by the rubber casing which becomes unwrapped around the bolt shanks as the bolt ends are pushed through the interlayer during assembly and folded back to form rubber washers. A fabricated metal product having uniformly tight bolts and nuts is thus assured. Additionally, the time consuming and costly operation of pre-punching holes in the vulcanized rubber interlayers is also saved.

Pads and interlayers made in accordance with this invention may also be compounded and prepared at substantially less cost than various pads and interliners heretofore provided for cushioning purposes. Substantial additional savings are effected in the use and application of these improved interliners since they are easy to apply and will tenaciously adhere to any metal part against which the pressure sensitive rubber cement surface thereof is pressed, whether such surfaces are vertical or horizontal. Further, the paint baking treatment, which heretofore has caused serious and damaging deterioration of the cushioning strips and pads heretofore employed, is turned to decided advantage, without interruption or change in normal paint baking procedures, with the achievement of a more durable fabricated metal product at substantial saving and cost.

While certain novel features of the invention have been disclosed above, and are pointed out in the annexed claims, it will be understood that various omissions, substitutions, and changes may be made by those skilled in the art without departing from spirit of the invention.

What is claimed is:

1. An improved procedure for forming cushioned joint assemblies which includes, adhesively securing an unbroken cushioning strip of doughy consistency and formed from an uncured pressure mouldable and thermo-setting filler loaded rubber compound to a metal part, and after applying the associated metal part, puncturing the uncured rubber interlayer when inserting the tie bolt through the aligned holes in the metal parts and thereby simultaneously encasing the inserted bolt shank with an adhering collar of the doughy rubber compound, applying and tightening the nut to the tie bolt to thereby form a doughy washer portion from excess compound squeezed from the bolt shank by the bolt nut and extruded between the adjacent faces of the nut and the metal part, and thereafter curing the thus assembled interliner by subjecting the assembled joint to the curing effects of paint baking heat during the paint baking interval.

2. In the manufacture of fabricated metal products having cushioned metal joints, the steps which include, placing a strip of uncured pressure mouldable and thermosetting filler loaded rubber of doughy consistency between the adjacent metal parts of the joint to form a cushioning interliner, simultaneously with the insertion of the bolt shank into the bolt holes in the metal parts puncturing the uncured rubber interliner to thereby encase the bolt shank with a sheathing layer of the uncured and doughy rubber compound drawn from the bolt punctured area of the interliner, applying a nut to the bolt, tightening the nut to thereby compress the interliner compound between the metal parts, fill the bolt hole voids with doughy interliner compound, skin off excess compound from the bolt shank and form the excess compound into a doughy sealing washer extruded between the nut and the adjacent surface of the adjacent metal part, and thereafter curing the filler loaded interliner compound in situ.

3. In the manufacture of fabricated metal products having cushioned metal joints, the steps which include, placing a strip of uncured pressure mouldable and thermosetting filler loaded rubber of doughy consistency between the adjacent metal parts of the joint to form a cushioning interliner, simultaneously with the insertion of the bolt shank into the bolt holes in the metal parts puncturing the uncured rubber interliner to thereby encase the bolt shank with a sheathing layer of the uncured and doughy rubber compound drawn from the bolt punctured area of the interliner, applying a nut to the bolt, tightening the nut to thereby compress the interliner compound between the metal parts, fill the bolt hole voids with doughy interliner compound, skin off excess compound from the bolt shank and form the excess compound into a doughy sealing washer extruded between the nut and the adjacent surface of the adjacent metal part, and thereafter curing the filler loaded interliner compound in situ to provide a cured filler loaded rubber interliner tenaciously bonded to the adjacent surfaces of the bolts, nuts and metal parts.

4. In the manufacture of fabricated metal products having cushioned metal joints, the steps which include, placing a strip of uncured pressure mouldable and thermosetting filler loaded rubber of doughy consistency between the adjacent metal parts of the joint to form a cushioning interliner, simultaneously with the insertion of the bolt shank into the bolt holes in the metal parts puncturing the uncured rubber interliner to thereby encase the bolt shank with a sheathing layer of the uncured and doughy rubber compound drawn from the bolt punctured area of the interliner, applying a nut to the bolt, tightening the nut to thereby compress the interliner compound between the metal parts, fill the bolt hole voids with doughy interliner compound, skin off excess compound from the bolt shank and form the excess compound into a doughy sealing washer extruded between the nut and the adjacent surface of the adjacent metal part, applying a paint coat to the fabricated product, subjecting the paint coat to paint baking heat, and simultaneously with the paint baking treatment, heat curing the filler loaded interliner compound forming a part of the assembled metal joint to provide a heat vulcanized interliner tenaciously bonded to the adjacent metal parts.

References Cited in the file of this patent

UNITED STATES PATENTS

| Number | Name | Date |
|---|---|---|
| 1,440,455 | Gardner | Jan. 2, 1923 |
| 1,614,348 | Cresson | Jan. 2, 1927 |
| 1,723,307 | Sipe | Aug. 6, 1929 |
| 1,730,799 | Bowes | Oct. 8, 1929 |
| 1,893,966 | Shew | Jan. 10, 1933 |
| 2,031,960 | Kempel | Feb. 25, 1936 |
| 2,146,595 | Schwartz et al. | Feb. 7, 1939 |
| 2,179,476 | Andrus | Nov. 14, 1939 |
| 2,251,417 | Parker | Aug. 5, 1941 |
| 2,257,589 | Bracket | Sept. 30, 1941 |
| 2,292,813 | Bagley et al. | Aug. 11, 1942 |
| 2,383,155 | Peirson | Aug. 21, 1945 |
| 2,417,263 | Morehouse | Mar. 11, 1947 |
| 2,438,472 | Calcott | Mar. 23, 1948 |
| 2,460,181 | Marshall | Jan. 25, 1949 |
| 2,506,728 | McGrath | May 9, 1950 |

OTHER REFERENCES

Barron: Modern Rubber Chemistry, published by D. Van Nostrand Co., Inc. (1948), pages 155, 188, 397 and 449. (Copy in Div. 50 TS 1890 B 27.)